(12) United States Patent
Hicok

(10) Patent No.: US 7,255,730 B2
(45) Date of Patent: Aug. 14, 2007

(54) FLUID DECELERATION/DE-AERATION DEVICE

(75) Inventor: Gaylen Eugene Hicok, Charles City, IA (US)

(73) Assignee: Deere & Company, Moline, IL (US)

( * ) Notice: Subject to any disclaimer, the term of this patent is extended or adjusted under 35 U.S.C. 154(b) by 343 days.

(21) Appl. No.: 10/968,516

(22) Filed: Oct. 19, 2004

(65) Prior Publication Data

US 2006/0081129 A1    Apr. 20, 2006

(51) Int. Cl.
*B01D 19/00* (2006.01)

(52) U.S. Cl. .............................. 96/204; 95/260; 60/453; 137/565.37

(58) Field of Classification Search ................. 96/204, 96/155; 95/260; 137/565.37; 60/453
See application file for complete search history.

(56) References Cited

U.S. PATENT DOCUMENTS

| | | | |
|---|---|---|---|
| 1,985,748 A * | 12/1934 | Svenson | 137/563 |
| 2,174,850 A * | 10/1939 | Svenson | 82/117 |
| 2,355,357 A * | 8/1944 | Kleinhans et al. | 60/405 |
| 2,478,428 A | 8/1949 | Shaw et al. | 183/2.5 |
| 3,245,220 A * | 4/1966 | Bilton | 60/336 |
| 4,039,305 A * | 8/1977 | Livesay | 96/219 |
| 4,746,335 A | 5/1988 | Reimann et al. | 55/170 |
| 5,101,885 A | 4/1992 | Drake | 165/47 |
| 5,326,386 A | 7/1994 | Lee et al. | 96/6 |
| 5,727,390 A * | 3/1998 | Hartle | 60/453 |
| 5,809,866 A | 9/1998 | Brascher et al. | |
| 6,402,810 B1 | 6/2002 | Mayer et al. | 95/46 |
| 7,105,044 B2 * | 9/2006 | Konishi et al. | 96/208 |
| 2004/0187931 A1 | 9/2004 | Crossman et al. | |

FOREIGN PATENT DOCUMENTS

| | | |
|---|---|---|
| DE | 27 41 614 | 5/1978 |
| DE | 196 12 593 | 10/1996 |
| DE | 103 23 068 | 12/2003 |
| DE | 102 42 050 | 3/2004 |
| DE | 102 44 383 | 4/2004 |
| DE | 103 08 560 | 9/2004 |
| WO | WO 89/08 783 | 9/1989 |

* cited by examiner

*Primary Examiner*—Duane Smith
*Assistant Examiner*—Douglas J. Theisen

(57) ABSTRACT

A fluid deceleration device is provided for a hydraulic system having a housing forming a sump, and a valve unit having an outlet port through which hydraulic fluid is expelled for communication to the sump. The fluid deceleration device includes an elongated tilted fluid container and a conduit which communicates fluid from the outlet port to an interior of the container. The container has an upper open end surrounded by a lip. When the container is filled, de-aerated fluid spills over the lip and falls into the sump.

13 Claims, 2 Drawing Sheets

FLUID DECELERATION/DE-AERATION DEVICE

BACKGROUND

The present invention relates to a fluid deceleration/de-aeration device for a hydraulic system.

Tractor hydraulic systems include, among other components, hydraulic pumps, a hydraulic sump or reservoir, hydraulic functions such as cylinders, and control valves which control communication between the pump, the sump and the hydraulic function. Hydraulic reservoirs or sumps have been used to store fluid and provide de-aerating time for the hydraulic fluid. If the fluid is not de-aerated properly the hydraulic pump is susceptible to cavitation damage and failure. Aerated oil in a hydraulic system can cause noise, erratic operation and heat, and can reduce component life. For example, in certain tractor hydraulic systems hydraulic fluid can be atomized if it flows with excessive velocity out of a control valve port as it is communicated to the sump, thus causing the hydraulic fluid in the sump to become mixed with air or aerated.

SUMMARY

Accordingly, an object of this invention is to provide a system for decelerating and de-aerating hydraulic fluid in a hydraulic system.

This and other objects are achieved by the present invention, wherein a hydraulic system includes sump formed by a lower portion of a housing. A valve unit has an outlet port through which hydraulic fluid is expelled for communication to the sump. A pipe or conduit communicates fluid from the valve outlet port to an interior of a container which is separate from the sump. The container is elongated and tilted at an angle between vertical and horizontal. The conduit is fixed to an inner wall of the container. The container has a lower closed end and an upper open end. Hydraulic fluid flows from the outlet port to the container where it settles and de-aerates. When the container is filled, de-aerated fluid spills over a lip surrounding the open end and falls into the sump.

DETAILED DESCRIPTION

Figure 1:
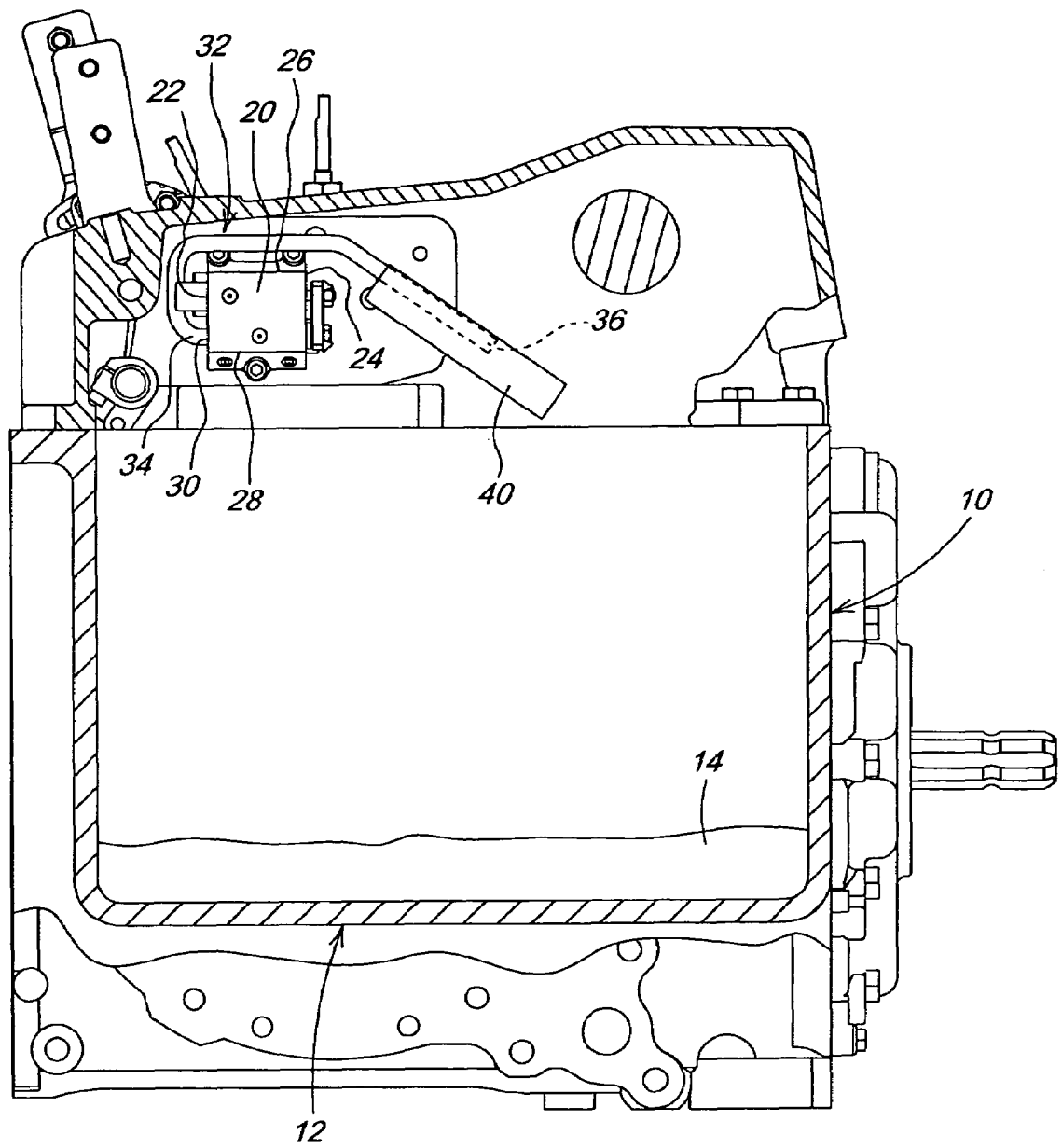
FIG. 1 is a partially sectional side elevation view of a portion of a hydraulic system including a fluid deceleration device according to the present invention.

Referring to FIG. 1, a housing 10, such as a rockshaft valve housing, includes a lower portion 12 which forms a hydraulic fluid reservoir or sump 14. A valve unit 20 is mounted within housing 10. Valve unit 20 includes a pair of side surfaces 22, 24, a top surface 26 and a bottom surface 28. An outlet port 30 is formed in side surface 22.

A conduit 32 has a first end 34 which is connected to outlet port 30 and a second end 36 which is received by a container 40. A first portion 31 of conduit 32 extends generally vertically over first side 22. A second portion 33 of conduit extends generally horizontally over top surface 26. A third portion 35 of conduit 32 extends downwardly and laterally away from the second portion, and extends into and is received by container 40.

Figure 2:
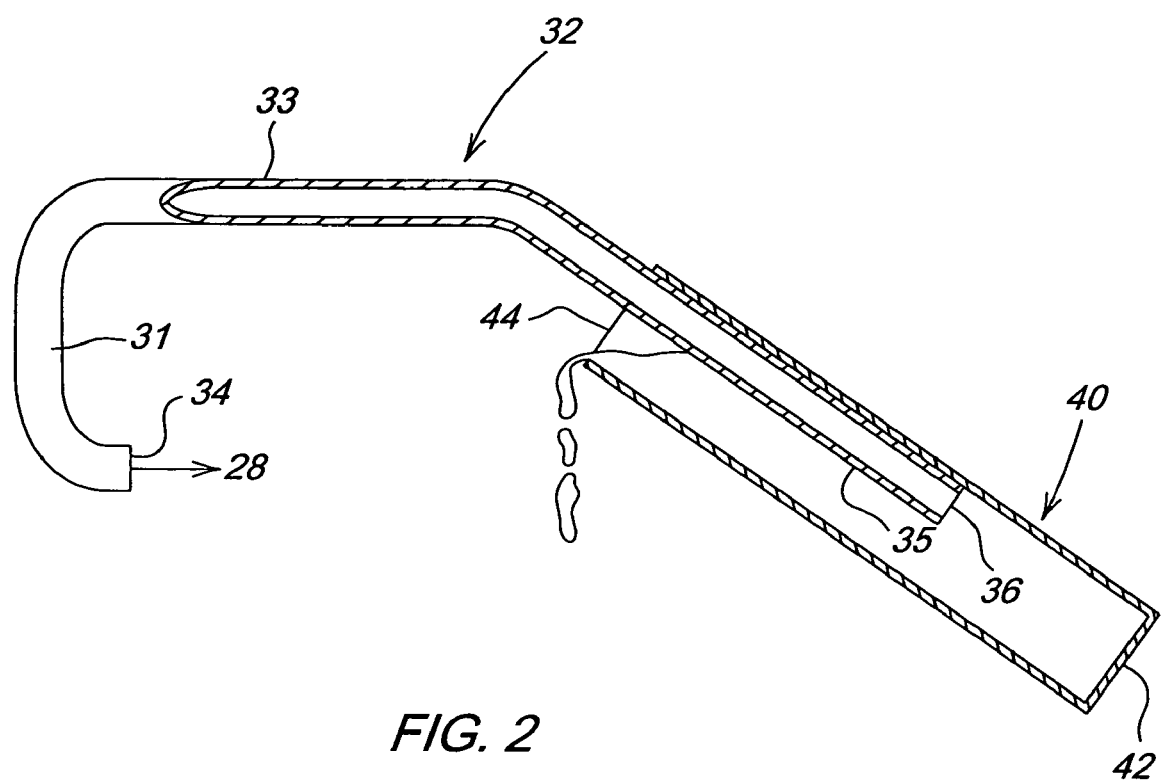
FIG. 2 is an enlarged view of the fluid deceleration device of FIG. 1.

As best seen in FIG. 2, container 40 is an elongated cylinder with a lower closed end 42 and an upper open end 44. Container 40 has a central axis which extends at an angle between horizontal and vertical. The end part of the third conduit portion 35 is attached to an inner surface of the container 40.

Fluid expelled from valve outlet 30 flows through conduit 32 and into container 40, where its velocity is reduced and where it settles. When the container 40 becomes full of hydraulic fluid, fluid will gently flow over the lip surrounding open end 44 and fall into the reservoir 14. This significantly reduces aeration of the fluid and reduces aeration-related problems in other hydraulic system components and extends component life.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a hydraulic system having a housing forming a sump, and a valve unit having an outlet port through which hydraulic fluid is expelled for communication to the sump, characterized by:

a fluid deceleration/de-aeration device comprising a fluid container and a conduit communicating fluid from the outlet port to an interior of the container, the container having an opening surrounded by a lip over which fluid spills into the sump when the container is filled, the container having a closed end and an open end, the container having an inner wall which is fixed to a portion of the conduit, and the conduit having an outlet end which is received by the container.

2. The hydraulic system of claim 1, wherein:

the container is elongated and has a closed end and an open end, and the conduit has an outlet end which is received by the container.

3. The hydraulic system of claim 1, wherein:

the container has a closed end and an open end, and the conduit extends through the open end to an outlet end which is received by the container.

4. The hydraulic system of claim 1, wherein:

the container is elongated and hollow, and has a closed end and an open end, the open end being positioned higher than the closed end, and the conduit has an outlet end which is received by the container.

5. The hydraulic system of claim 4, wherein:

the container has a central axis which extends at an angle between horizontal and vertical.

6. The hydraulic system of claim 1, wherein:

the valve unit has a top surface, a first side surface and a second side surface spaced away from the first side surface and facing away therefrom, the outlet port being formed in the first side surface, and the second side surface facing towards the fluid container.

7. The hydraulic system of claim 6, wherein:

the conduit is routed over the top surface of the valve unit.

8. The hydraulic system of claim 1, wherein:

the container is spaced apart from the sump.

9. The hydraulic system of claim 1, wherein:

the container is spaced apart from and above the sump.

10. In a hydraulic system having a housing forming a sump, and a valve unit having an outlet port through which hydraulic fluid is expelled for communication to the sump, characterized by:

a fluid container spaced apart from and above the sump; and a conduit communicating fluid from the outlet port to the container, the container holding the fluid while it de-aerates, de-aerated fluid spilling out of the container and falling into the sump, the container is elongated and has a central axis which extends at an angle between horizontal and vertical.

11. The hydraulic system of claim 10, wherein:

the conduit communicates fluid to an interior of the container.

12. In a hydraulic system having a housing forming a sump, and a valve unit having an outlet port through which hydraulic fluid is expelled for communication to the sump, characterized by:

a fluid deceleration/de-aeration device comprising a fluid container and a conduit communicating fluid from the outlet port to an interior of the container, the container having an opening surrounded by a lip over which fluid spills into the sump when the container is filled, and the conduit being routed over a side surface and a top surface of the valve unit.

13. In a hydraulic system having a housing forming a sump, and a valve unit having an outlet port through which hydraulic fluid is expelled for communication to the sump, characterized by:

a fluid container spaced apart from and above the sump; and a conduit communicating fluid from the outlet port to the container, the container holding the fluid while it de-aerates, de-aerated fluid spilling out of the container and falling into the sump, the container having an inner wall which is fixed to a portion of the conduit, and the conduit having an outlet end which is received by the container.

* * * * *